US008508545B2

(12) United States Patent
Holt

(10) Patent No.: US 8,508,545 B2
(45) Date of Patent: Aug. 13, 2013

(54) METHOD AND APPARATUS PERTAINING TO RENDERING AN IMAGE TO CONVEY LEVELS OF CONFIDENCE WITH RESPECT TO MATERIALS IDENTIFICATION

(75) Inventor: Kevin M. Holt, Chicago, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 581 days.

(21) Appl. No.: 12/779,538

(22) Filed: May 13, 2010

(65) Prior Publication Data

US 2011/0280440 A1    Nov. 17, 2011

(51) Int. Cl.
  *G09G 5/00*    (2006.01)
  *G09G 5/02*    (2006.01)
  *G06F 11/00*    (2006.01)
  *H04N 1/40*    (2006.01)
  *G06K 9/40*    (2006.01)
  *G03F 3/08*    (2006.01)

(52) U.S. Cl.
  USPC ........... 345/589; 345/581; 345/593; 345/619; 345/690; 358/1.9; 358/520; 358/448; 382/162; 382/254

(58) Field of Classification Search
  CPC ....................................................... G06T 11/30
  USPC ............... 345/428, 581–582, 589, 592–593, 345/600–601, 606, 611, 619, 616, 618, 690, 345/594, 474, 538, 549; 348/253–254, 266, 348/552, 557; 358/1.9, 2.1, 3.03, 518–520, 358/447–448, 461, 452–453; 382/162–167, 382/254, 274, 276, 305, 307; 711/100
  See application file for complete search history.

(56) References Cited

U.S. PATENT DOCUMENTS

| | | | |
|---|---|---|---|
| 4,511,799 A | 4/1985 | Bjorkholm | |
| 5,524,133 A | 6/1996 | Neale et al. | |
| 5,917,880 A | 6/1999 | Bjorkholm | |
| 6,069,936 A | 5/2000 | Bjorkholm | |
| 6,546,072 B1 | 4/2003 | Chalmers | |
| 7,257,188 B2 | 8/2007 | Bjorkholm | |
| 7,636,417 B2 | 12/2009 | Bjorkholm | |
| 2005/0276481 A1* | 12/2005 | Enomoto | 382/190 |
| 2006/0170939 A1* | 8/2006 | Misumi | 358/1.9 |
| 2007/0273686 A1* | 11/2007 | Watanabe et al. | 345/419 |
| 2010/0039539 A1* | 2/2010 | Kinoshita | 348/242 |
| 2011/0182500 A1* | 7/2011 | Esposito et al. | 382/159 |

OTHER PUBLICATIONS

Ogorodnikov et al., "Processing of Interlaced Images in 4-10 MeV Dual Energy Customs System for Material Recognition," Physical Review Special Topics—Accelerators and Beams, vol. 5, Issue 10; 104701 (2002); 11 pages.

Holt, "Method and Apparatus to Facilitate Using Fused Images to Identify Materials;" U.S. Appl. No. 12/479,322, filed Jun. 5, 2009; 92 pages.

Fox et al., "Method and Apparatus to Facilitate Using Multiple Radiation-Detection Views to Differentiate One Material from Another;" U.S. Appl. No. 12/479,376, filed Jun. 5, 2009; 28 pages.

* cited by examiner

*Primary Examiner* — Wesner Sajous
(74) *Attorney, Agent, or Firm* — Fitch, Even, Tabin & Flannery LLP

(57) ABSTRACT

A control circuit accesses image information regarding an image of a target. This information comprises, at least in part, information regarding material content of the target. The control circuit also accesses confidence information regarding at least one degree of confidence as pertains to the target's material content. The control circuit uses this confidence information to facilitate rendering the image such that the rendered image integrally conveys information both about materials included in the target and a relative degree of confidence that the materials are correctly identified.

24 Claims, 3 Drawing Sheets

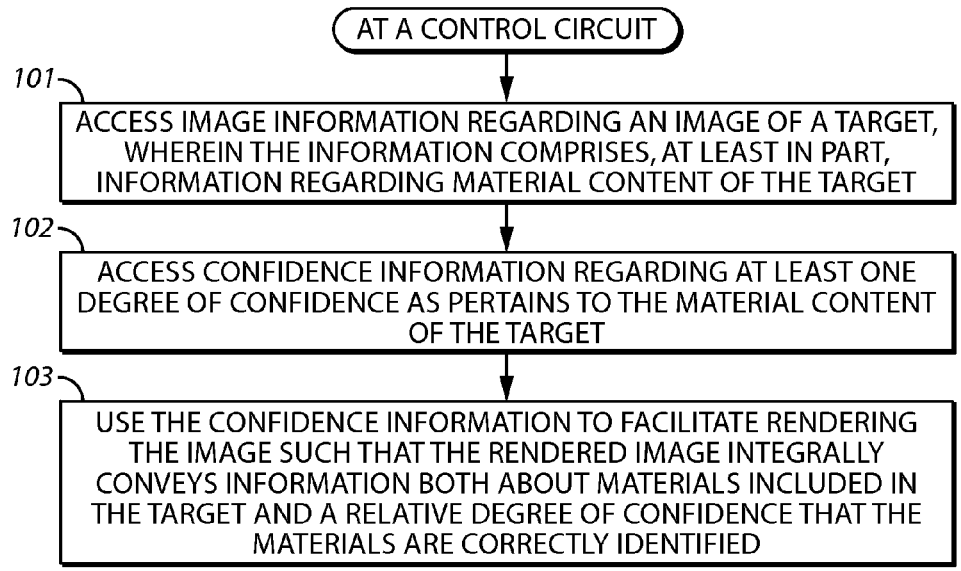
*FIG. 1*
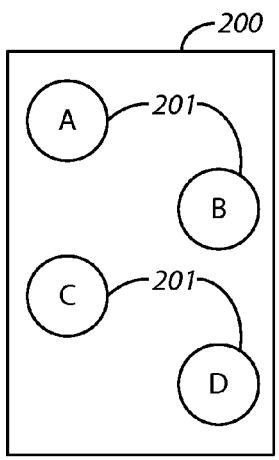
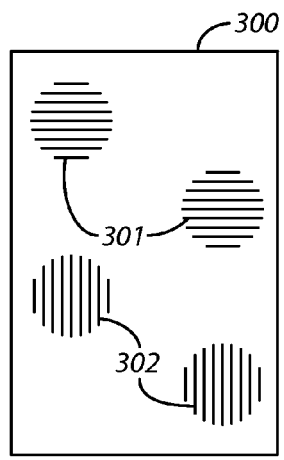
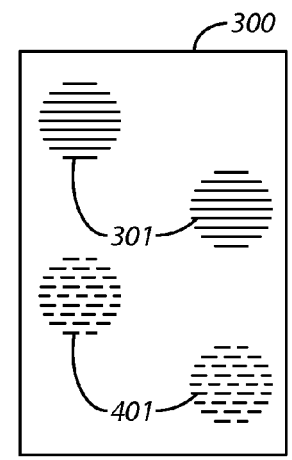
*FIG. 2*   *FIG. 3*   *FIG. 4*

METHOD AND APPARATUS PERTAINING TO RENDERING AN IMAGE TO CONVEY LEVELS OF CONFIDENCE WITH RESPECT TO MATERIALS IDENTIFICATION

TECHNICAL FIELD

This invention relates generally to rendering an image corresponding to a target object, wherein the image conveys information regarding one or more identified materials that comprise the target object.

BACKGROUND

High-energy (such as, but not limited to, x-rays) can be used to develop images of a target (such as a person or inanimate object) that reveal structures that are not visible to the naked eye using the visible-light spectrum. The prior art also explains how such technologies can discriminate between the various materials that might comprise the target. By one approach, for example, multiple energy levels can provide corresponding information that permits discrimination amongst, and/or identification of, the class of materials that comprise a given target.

Materials discrimination finds use in various application settings. Such teachings are particularly useful, for example, when quickly assessing the contents of checked airline baggage, a cargo container, a truck compartment, or the like. In many cases, an end user can observe a rendered image of the target that utilizes variations in the rendering to convey information regarding the discriminated materials. As a simple example, one can utilize the color blue to identify metals of a first class (such as medium-Z materials (for example, steel, brass, iron, nickel and many other non-radioactive materials)) and the color red to identify metals of a second class (such as high-Z materials (for example, tungsten, lead, gold, and a variety of radioactive materials such as uranium and plutonium)).

Unfortunately, such discrimination capabilities are not always utterly reliable. In many cases there can be degrees of uncertainty regarding the identity of a particular material. Such uncertainty, of course, can be of lesser or greater importance depending upon the application setting and/or the material in question.

Unfortunately, many present rendering techniques provide essentially no information in these regards. Typically, the rendered image of the target simply reflects the best available assessments of the constituent materials. As one possibly-strained example for the sake of illustration, such a process may be 40% certain that a given part of a target is material A, 30% certain that the given part is material B, and 30% certain that the given part is material C. Though in sum total the process could be said to actually not be certain at all about what this given part is made of, such a process might nevertheless render a corresponding image that portrays the given part as being made of material A since that is the best guess, relatively speaking.

While useful for many application settings, there may well be contexts where such an approach leaves more to be desired in these regards.

BRIEF DESCRIPTION OF THE DRAWINGS

The above needs are at least partially met through provision of the method and apparatus pertaining to rendering an image to convey levels of confidence with respect to materials identification described in the following detailed description, particularly when studied in conjunction with the drawings, wherein:

FIG. 1 comprises a flow diagram as configured in accordance with various embodiments of the invention;

FIG. 2 comprises a schematic representation of a target as configured in accordance with various embodiments of the invention;

FIG. 3 comprises a schematic representation of a rendered image as configured in accordance with various embodiments of the invention;

FIG. 4 comprises a schematic representation of a rendered image as configured in accordance with various embodiments of the invention;

Figure 5:
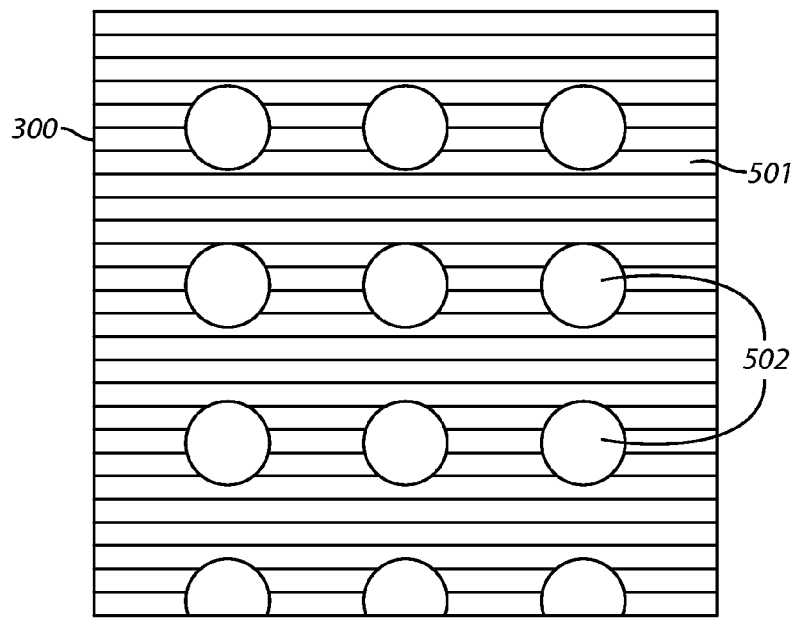
FIG. 5 comprises a schematic representation of a rendered image as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit accesses image information regarding an image of a target. This information comprises, at least in part, information regarding material content of the target. The control circuit also accesses confidence information regarding at least one degree of confidence as pertains to the target's material content. The control circuit uses this confidence information to facilitate rendering the image such that the rendered image conveys information both about materials included in the target and a relative degree of confidence that the materials are correctly identified. By one approach this rendered image can integrally convey information about both the material and the corresponding relative degree of confidence.

By one approach, the foregoing can comprise selecting a color component to use when rendering the image as a function of the relative degree of confidence. This color component can comprise, for example, a hue, chroma, saturation, lightness, brightness, transparency, or grayscale component or value to indicate a relative lack of confidence that a particular material is correctly identified.

By one approach, this selection can comprise using a confidence level-based decision to assess when to select the color component as a function of this relative degree of confidence. This might comprise, in some cases, using a fairly binary approach. In other cases, this might comprise using a range of three or more differing degrees of confidence (and corresponding color components). By one approach, for example, a plurality of differing color tuples can serve to indicate corresponding differing degrees of confidence.

These teachings are highly flexible in practice. By one approach, for example, these teachings will accommodate utilizing animation to reflect the aforementioned degree of confidence. By one approach, this might comprise slightly vibrating a displayed portion such that the amount or degree of vibration increases as confidence decreases. As another example, this animation might comprise a display duty cycle component that varies as a function of the aforementioned degree of confidence. So configured, for example, the on-time for a given color component can be reduced as the confidence level drops.

So configured, these teachings can serve to convey images that integrally (and in some cases intuitively) provide rich information regarding not only the materials that comprise a given target but a degree of confidence as pertains to the certainty of that information. These approaches are readily scaled to accommodate a variety of rendering settings (for example, monochromatic displays, multi-color displays, full-color displays, and so forth) as well as the range of materials that can be identified in a given application setting. These approaches are also readily applied in application settings where more than one view of confidence can be independently assessed and taken into account.

These teachings are readily employed in conjunction with numerous existing approaches. Accordingly, these teachings can serve to greatly leverage the functionality and value of many already-deployed systems in the field. These benefits can be achieved, in many cases, with minimal or no hardware changes or accommodations and hence are economically practiced.

These and other benefits may become clearer upon making a thorough review and study of the following detailed description. Referring now to the drawings, and in particular to FIG. 1, an illustrative process 100 that is compatible with many of these teachings will now be presented. This process 100 can be carried out, for example, via a corresponding control circuit as will be described below.

Pursuant to step 101 this process 100 accesses image information regarding an image of a target. This information comprises, at least in part, information regarding material content of the target. This material may be referred to occasionally herein as Z. Referring momentarily to FIG. 2, a schematically-represented target 200 will be presumed, for the sake of illustration, to be comprised of four areas 201 A, B, C, and D that are each comprised of a same material.

Such information can be developed, for example, by using high-energy imaging employing, for example, x-rays, proton rays, and so forth. Neutron detection, passive radiation detection, and other penetrating signals may also be used, in combination with the foregoing or in lieu thereof. As these teachings are not overly sensitive to any particular selections in these regards, further elaboration in these regards will not be provided here.

At step 102 this process 100 accesses confidence information regarding at least one degree of confidence as pertains to the material content of this target. The precise nature of this confidence information can and will vary with the application setting. This metric (which indicates a degree of confidence that a material identified as Z is, in fact, Z) may be referred to occasionally herein as $\sigma_z$. Examples in these regards include, but are not limited to, information reflecting an insufficient quantity of material to permit reliable assessment (characterized by too high a transmission value (P)), information reflecting an excessive quantity of material (such that the energy of the assessment mechanism is insufficient to provide enough resultant penetrating energy (such as, for example, photons) that successfully passes through the material, characterized by too low a transmission value (P)), information reflecting excessive noise (either measured or estimated) or motion, information reflecting registration quality, information reflecting structurally-based assessment challenges (such as strong edges or textures), information reflecting an aliasing risk (i.e., the risk of confusion between two dissimilar materials that may yield similar imaging signatures but that are, in fact of substantially different compositions), information reflecting a disallowed region (for example, a disallowed (P,Z) region where there is some boundary in (P,Z) space defining a good (believable) region of (P,Z) points and a bad (unbelievable) region of (P,Z) points, or a disallowed (P1, P2, . . . , Pn) region where there is some region of transmission values for which one may reasonably believe the resulting Z and some region where such belief is not prudent), and so forth.

It should be noted that while this description refers to $\sigma_z$ for simplicity as "confidence," numerically it could represent a conventional confidence value (for example, a probability from 0 to 1, or 0% to 100%), an accuracy value on Z (such as Z+/−5) or a related statistical measure such as standard deviation, an image-based feature (say, the amount of local structure), an image-derived distance value (say, the distance of a set of transmission measurements from some mathematical boundary), a binary decision result, or other generalizations of accuracy, risks, or confidence, including functions or combinations of any of the above.

This step 102 can also take into account information that is available a priori and that can pertain to the assessment activity. As one example in these regards, when assessing the contents of the cargo area of a truck, knowing beforehand that the vehicle's cargo manifest declares the contents to be vegetables may be used to influence the confidence that the image information is correct when identifying the cargo as being organic material. As another example in these regards, a priori knowledge regarding a perceived level of general or specific risk may be used as to tighten, or to loosen, the application of other confidence information that is accessed pursuant to this step. And as yet a further example in these regards, the contextual or relative location of the object being assessed may also sometimes provide useful a priori knowledge. To illustrate, one may be more confident that a material identified as lead when that material is located in a portion of a vehicle where one would ordinarily expect to find the vehicular battery.

As noted above, this confidence information is with regard to at least one degree of confidence. In many application settings there may be only a single such degree of confidence.

In some cases, however, there may be two or more independent (or partially independent) degrees of confidence. This could be because a single output measurement has two or more different types of confidence information, or it could be because there are multiple output measurements, each with their own confidence value(s). Such can occur, for example, when two differing levels of energy are used to differentiate organic from inorganic materials and three differing levels of energy (which may, or may not, include the previously-mentioned "two differing levels of energy" as desired) serve to assess the purity of the discriminated material. In such a case, the material class assessment and the purity assessment could have different corresponding degrees of confidence.

As another example in these regards, dual-energy scanning could have multiple confidence scores by, for example, providing each image pixel with both a noise value (representing, for example, standard deviation assuming no substantial aliasing) and an aliasing risk value. As another example, the assessment could provide separate probabilities for classes and sub-classes. For example, a material could be assessed to be water (a member of the organic class) with one confidence value for the water assessment and a separate confidence value for the organic assessment. Similarly, multiple degrees of confidence can accompany the use of multiple kinds of differentiated assessment methodologies. For example, x-rays and neutron detection could each have their own independent and separate sense of confidence as regards their corresponding results.

This process 100, at step 103, then uses this confidence information to facilitate rendering the image such that the rendered image (integrally or otherwise) conveys information both about materials included in the target and a relative degree of confidence that the materials are correctly identified. (As used herein, "render" and its various forms refers to transforming digital information into a displayed form, as on an active display or a printout, and "integrally" refers to co-joining the information about the material itself along with the relative confidence that the material is correctly identified.) These teachings will accommodate a wide range of possibilities in these regards. For the sake of illustration and with no intent of suggesting any limitations in these regards, a number of these possibilities will now be discussed.

By one approach, these teachings can be combined with the display of a third item of information; the amount of material that is present (or related value). In such a case, for example, one can map hue to the material information, map saturation to the relative degree of confidence that the material is correctly identified, and map intensity to the transmission information (which correlates to how much of the material is present).

Referring again to FIG. 2, for the purpose of these examples it will be presumed that all of the previously-noted sections 201 A, B, C, and D have been identified as being comprised of a same given material but with differing degrees of confidence. In particular, section A has a 95% degree of confidence, section B has a 60% degree of confidence, section C has a 40% degree of confidence, and section D has a 10% degree of confidence. (These degrees of confidence are not necessarily realistic but they will serve to help illustrate certain concepts in the following examples.)

By one approach, a single threshold value pertaining to confidence serves to determine the presentation of the identified material. As a simple example, 51% might serve in this regard. With reference to FIG. 3, in this case two of the sections 301 are rendered using the color blue (where blue has been previously established as identifying this particular material) and two of the sections 302 are rendered using the color red (where red has been previously established as representing insufficiently-categorized material). These color assignments reflect that the two blue sections 301 have degrees of confidence of at least 51% while the two red sections 302 have degrees of confidence of less than the 51% threshold.

So configured, this process 100 selects a color component as a function of the relative degree of confidence that the corresponding material is correctly identified. In particular, the process 100 uses the confidence-level decision to assess when to select the color component. In the example just given, the hue varies with these degrees of confidence. There are many color spaces available to work with in these regards, however, including RGB, HSV, HSL, XYZ, LUV, UVW, LAB, YCbCr, L*a*b*, CMYK, sRGB, RGBA, YIQ, YPbPr, xvYCC, and more, all of which are known in the art.

This can also include, if desired, using a grayscale component to indicate a relative lack of confidence that the particular material is correctly identified. Using this approach, for example, the sections 302 described above as being colored red could instead be rendered using a grayscale value to reflect that these sections are insufficiently categorized. As a more specific example, when employing Hue, Saturation, and Intensity (HSI) as the color space, the hue for a given pixel can be selected as a function of the identified material (Z) and the saturation value for that pixel then selected as a function of the $\sigma_Z$ value such that saturation is set to "1" (i.e., "full color") when confidence is adequate and to "0" (i.e., "grayscale") when confidence is inadequate. If desired, one can elaborate further in these regards by selecting another color component, such as the intensity of this pixel, as a function of the corresponding transmission value (P) to thereby indicate the amount of the material.

The particular color component can vary considerably depending upon the needs and/or opportunities as tend to characterize a given application setting. In addition to selecting hue and/or grayscale values as described, these teachings will readily accommodate selecting values for one or more of chroma, saturation, lightness, brightness, and/or transparency to provide the desired integrated visual cue. As one simple example in these regards, and referring now to FIG. 4, a dark blue color can serve to identify those sections 301 having a better than 51% confidence level while a lighter blue color can serve to identify those sections 401 having a less than 51% confidence level.

To generally illustrate by way of a more specific example, but without intending any limitations in these regards, for a fixed Z (i.e., a given material), the selected color components can change with the transmission value (P) rather than only with respect to hue. Such is the case in the following color map where, for a given material (Z), the HSI values for a given pixel can vary with the transmission value (P) as pertains to that particular pixel.

TABLE 1

| Z | P | H | S | I | |
|---|---|---|---|---|---|
| 8 | 0 | 0.08 | 1 | 0.35 | (dark orange) |
| 8 | 0.6 | 0.08 | 1 | 1 | (medium orange) |
| 8 | 1 | 0.08 | 0.6 | 1 | (light orange) |
| 13 | 0 | 0.25 | 1 | 0.35 | (dark green) |
| 13 | 0.6 | 0.25 | 1 | 1 | (green) |
| 13 | 1 | 0.25 | 0.6 | 1 | (light green) |
| 20 | 0 | 0.5 | 1 | 0.35 | (dark turquoise) |
| 20 | 0.6 | 0.5 | 1 | 0.9 | (turquoise/cyan) |
| 20 | 1 | 0.5 | 0.5 | 0.9 | (bright turquoise/cyan) |
| 26 | 0 | 0.667 | 1 | 0.35 | (dark blue) |

TABLE 1-continued

| Z | P | H | S | I | |
|---|---|---|---|---|---|
| 26 | 0.5 | 0.667 | 1 | 1 | (blue) |
| 26 | 1 | 0.667 | 0.4 | 1 | (light blue) |
| 82 | 0 | 0.8 | 1 | 0.35 | (dark indigo) |
| 82 | 0.5 | 0.8 | 1 | 0.8 | (indigo) |
| 82 | 1 | 0.75 | 0.6 | 0.8 | (light indigo) |
| n/c | 0 | 0 | 0 | 0 | (black) |
| n/c | 1 | 0 | 0 | 1 | (white) |

In the values presented above, "n/c" indicates "no-confidence," i.e. that Z could not be confidently measured. In this example, pixels with a sufficiently confident Z assessment are assigned a hue or hue-like value based on Z, whereas pixels without a confident Z measurement are shown in grayscale, and all pixels (whether confident/colored or no-confidence/grayscale) are shown to be brighter for higher transmissions and darker for lower transmissions. One can easily alter those conventions, however, subtly or drastically, by adjusting the values in the above table (for example, one could edit the table so that hue instead maps roughly to P and brightness maps roughly to Z). For values of P or Z not shown in the table, HSI values can be interpolated from the values in the table, for example by interpolating first by Z (to obtain a set of (P,H,S,I) 4-tuples) and then by P (to obtain H,S,I). For a binary confidence decision, the values can be either colored or in grayscale. For a continuous confidence decision, the color values can be interpolated (for example, interpolated in RGB space) between the colored and grayscale values.

As a related approach in these regards, these teachings will accommodate rendering a particular part of the target's image using, discretely, both a first color component that indicates a high degree of confidence and a second color component that indicates a relatively lower degree of confidence (such as, by one approach, a 0% degree of confidence). In this case, the second color component is present in an amount that is related to the actual degree of confidence that the section has been correctly categorized. This can comprise, by one simple approach, mottling or dithering the rendering of the relevant section.

FIG. 5 illustrates one approach in these regards. Here, the color blue 501 represents the material in question and the color white represents a lack of identification. White circles 502 are added to the blue 501 in a fairly evenly-distributed manner and in an amount that represents the level of confidence that the material is correctly identified. (It can be noted, however, that the arrangement can be other than in an evenly-distributed manner if desired. For example, a dithering algorithm could begin with a fully-colored image and then add white pixels at random until achieving a specified white-pixel density.) For example, if the confidence level were 75%, then the total area of this section could be dithered with the white circles 502 such that, in the aggregate, 25% of the section is white. Extending this example for the case where transmission is to be displayed integrally with material-type and material-confidence, the blue and white colors may have their intensities varied according to transmission (where, for example, the white becomes shades of gray). As another extension of this example, if $\sigma_z$ measures a standard-deviation of the Z assessment (rather than a confidence percentage), then the percentage of pixels that are colored white could be chosen to be proportional to $\sigma_z$.

Figure 6:
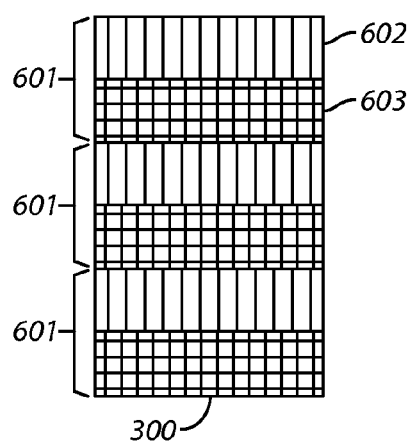
FIG. 6 comprises a schematic representation of a rendered image as configured in accordance with various embodiments of the invention.

FIG. 6 illustrates another approach in these regards. By this approach, a given section of identified material is parsed into a plurality of regions 601 (here, vertically-stacked bars). Each of these regions 601 comprises a first part 602 having a color component (here, the color red) that identifies a particular material and a second part 603 having a color component (here, the color yellow) that indicates the corresponding degree of confidence that the first color component 602 correctly identifies the material.

These teachings will accommodate a wide variety of variations in these regards. The circles 502 of FIG. 5, for example, could comprise any shape of interest and need not necessarily all be the same shape. The regions 601 of FIG. 6 could be horizontally-oriented bars, diagonally-oriented bars, and so forth. Likely countless other approaches could be employed without departing from the intent and scope of the described functionality.

Figure 7:
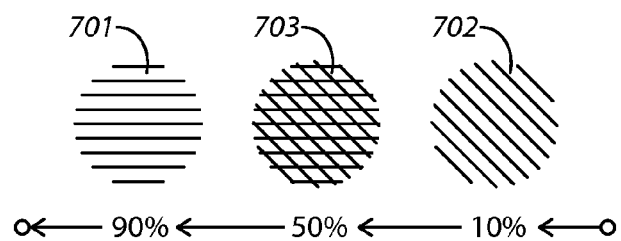
FIG. 7 comprises a schematic representation of a rendered image as configured in accordance with various embodiments of the invention.

These teachings will also admit somewhat more sophisticated approaches as well. For example, by one approach, one can employ a plurality of different color tuples to indicate corresponding differing degrees of confidence. FIG. 7 provides one illustrative example in such regards. Here, many of the possible degrees of confidence (for example, from 10% to 90%) are each assigned a different hue or combination of hues. As shown, a 10% degree of confidence (and all lesser degrees of confidence) is shown as pure green 702. Similarly, a 90% or higher degree of confidence appears as pure blue 701. In between these two values the colors blue and green are proportionally mixed. This approach then portrays a 50% degree of confidence as one-half blue and one-half green 703.

In the example just described, the hue shifted from one color to another across the range of possible degrees of confidence. If desired, this can be expanded to accommodate further primary hues. For example, a 10% degree of confidence could again be represented as green and a 90% degree of confidence could again be represented as blue but a 50% degree of confidence could be portrayed as pure red. In such a case, then, a 70% degree of confidence would comprise a fifty-fifty mix of blue and red while a 30% degree of confidence would comprise a fifty-fifty mix of green and red.

Figure 8:
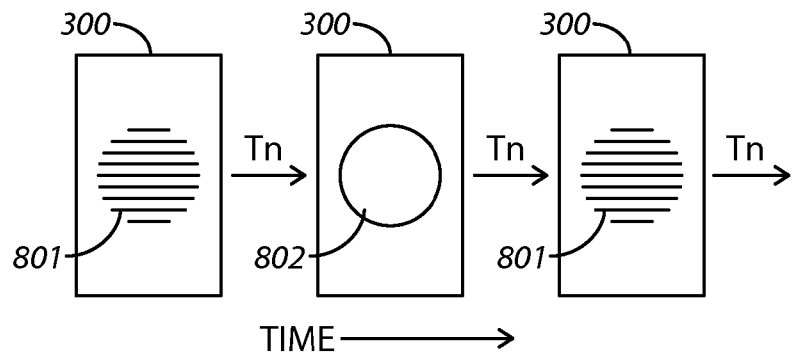
FIG. 8 comprises a schematic representation of a rendered image as configured in accordance with various embodiments of the invention.

By yet another approach, alone or in conjunction with the foregoing, animation can be utilized to represent the relative degree of confidence. For example, and referring now to FIG. 8, a given material might have been identified as being comprised of a material for which blue 801 is the corresponding hue. When the corresponding degree of confidence is better than some minimal requirement (such as, for example, 90%), the process 100 displays this blue 801 without variation over time. When such is not the case, however, the process 100 causes the display to toggle (either abruptly or smoothly) back and forth between blue 801 and white 802 (though other colors could serve as well). The rate at which this toggling occurs can be varied, if desired, to again reflect the corresponding degree of confidence or lack thereof. (And again, this can optionally be combined with also displaying the amount of material by, for example, varying the intensity of the blue and the white according to the amount of the material.)

In a very simple case, as when the process 100 simply communicates that the material is either identified with some given degree of assurance or it is not, the duty cycle for this resultant flashing could be 50%. In other cases, as when many of the degrees of confidence are correlated to a corresponding differing duty cycle, the amount of "on" time for the blue color could increase as the degree of confidence increases. Similarly, the degree of "off" time for the blue color could decrease as the degree of confidence decreases.

Figure 9:
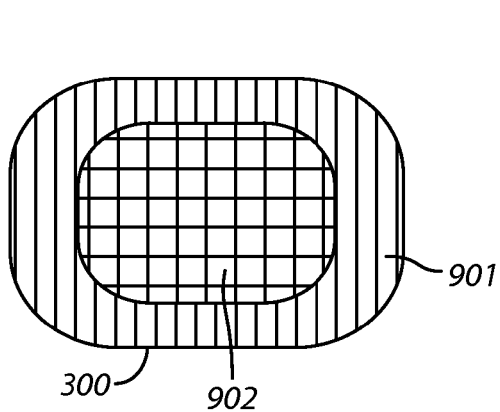
FIG. 9 comprises a schematic representation of a rendered image as configured in accordance with various embodiments of the invention.

As yet another illustrative example of the great flexibility of these teachings, and referring now to FIG. 9, the interior portion 902 of a section of identified material can be colored to represent the identified material (here, a yellow color to identify whatever material have been previously assigned to that color). At the same time, the periphery 901 of this section is treated differently to reflect the corresponding degree of confidence for the entire section. When the confidence is high, for example, this periphery 901 can be colored yellow to match the interior 902. When confidence is less, however, the periphery 901 can reflect this information. Here, the periphery 901 is colored red to indicate a corresponding reduced degree of confidence that the material identified with the yellow color is correctly identified.

As noted earlier, there can be more than one measure of confidence for a given identification of material in some application settings. If desired, these multiple measures can be combined into a single metric (for example, by averaging or multiplying the plurality of confidence measures in either a weighted or unweighted fashion). In that case, these teachings can employ that resultant metric as described above.

If desired, however, these teachings will also accommodate discretely applying those two-or-more measures of confidence. This can be accomplished, for example, by using two or more of the aforementioned techniques. To illustrate by way of a non-limiting example, the color for the identified material can be mottled or dithered with another color (as shown in FIG. 5) to reflect one measure of confidence while the process toggles the color for the identified material itself on and off as a reflection of another measure of confidence. As another simple illustration in these regards, an interior portion of a given displayed material can be treated with one of the techniques described above while a peripheral area to that given displayed material is treated with a different technique.

As a somewhat related example, such a display mechanism can serve to identify a candidate grouping of likely materials (to the exclusion of other materials) amongst which the process cannot ultimately confidently select but one. As a simple example in these regards, the identification process may be certain that the material is either material A or material B, and similarly certain that the material is not material C or material D. In such a case, the color component for material A and the color component for material B could both be utilized as per these teachings to indicate that the material is either material A or material B but not another material.

If desired, in such a case the relative confidence levels for these identifications can also serve to influence the use and presentation of the corresponding color component. For example, when there is a 75% confidence level that the material is material A and a 25% confidence level that the material is material B, the color component for material A could be utilized 75% as compared to only 25% for the color component for material B.

In cases where the process cannot identify a single material with a sufficient degree of confidence, and further where not a single material from amongst the plurality of candidate materials can be identified with a sufficient degree of confidence (such as better than 10%), these processes would accommodate, for example, switching from a full-color mode of display to using only a grayscale mode of display to express this state to the end user.

Most of the examples above, for the sake of simplicity, illustrate these concepts using a relatively binary approach; the level of confidence is either acceptable or it is not. In a few of the examples provided above, each of the degrees of confidence within a given range (such as from 10% to 90%) are assigned to a corresponding color component to yield a plurality of corresponding tuples. These teachings will also accommodate, however, the use of a greater number of threshold levels than the former while not necessarily requiring the granularity and complexity of the latter.

Figure 10:
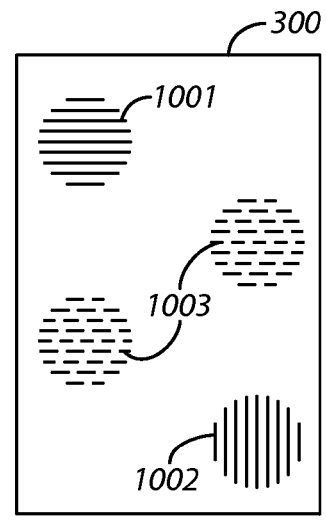
FIG. 10 comprises a schematic representation of a rendered image as configured in accordance with various embodiments of the invention.

As one illustrative example in these regards, this can comprise using at least three different ranges of confidence (such as low, medium, and high). For the sake of example and not by way of limitation, anything less than 20% might be considered low, anything greater than 80% might be considered high, and everything in between might be considered medium. In such a case, and referring now to FIG. 10, the aforementioned sections could be displayed using three different hues, blue 1001 for where the identification of material has a high confidence level, light blue 1003 where the identification has a medium confidence level, and red 1002 where the identification has a low confidence level.

Such a multi-threshold or multi-level approach will of course accommodate any number of thresholds/levels and any number of ways of selecting a corresponding color component to represent the resultant material.

Figure 11:
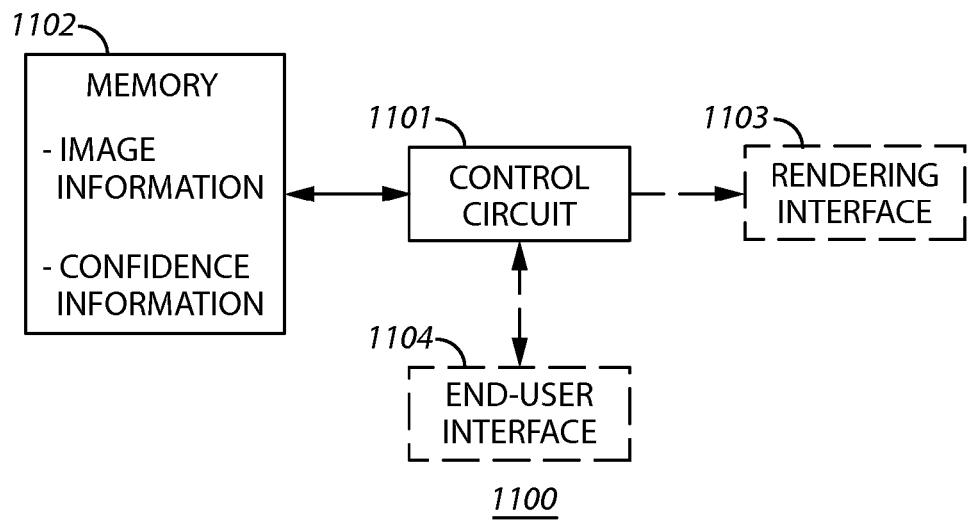
FIG. 11 comprises a block diagram as configured in accordance with various embodiments of the invention.

The above-described processes are readily enabled using any of a wide variety of available and/or readily configured platforms, including partially or wholly programmable platforms as are known in the art or dedicated purpose platforms as may be desired for some applications. Referring now to FIG. 11, an illustrative approach to such a platform will now be provided.

In this illustrative example the enabling apparatus 1100 includes a control circuit 1101 that operably couples to a memory 1102. The memory 1102 may comprise one or more discrete memory components and has the aforementioned image information and confidence information stored therein. The control circuit 1101 can comprise a fixed-purpose hard-wired platform or can comprise a partially or wholly programmable platform. All of these architectural options are well known and understood in the art and require no further description here.

The control circuit is configured (via, for example, corresponding programming as will be well understood by those skilled in the art) to carry out one or more of the aforementioned steps, actions, and/or functions. If desired, the apparatus 1100 can also include a rendering interface 1103 (such as an active monochromatic or multi-color active display of choice) and/or an end-user interface 1104 (such as a cursor-control device, keyboard, touchscreen, or the like) to permit an end user to initiate the described process.

So configured, the control circuit 1101 can access the memory 1102 to read the required image information and the corresponding confidence information and then use this information when rendering the image of a given target on the rendering interface 1103 such that the rendered image conveys information both about the materials as comprise the target and the relative degree of confidence that such materials are correctly identified.

Such an apparatus 1100 may be comprised of a plurality of physically distinct elements as is suggested by the illustration shown in FIG. 11. It is also possible, however, to view this illustration as comprising a logical view, in which case one or more of these elements can be enabled and realized via a shared platform. It will also be understood that such a shared platform may comprise a wholly or at least partially programmable platform as are known in the art.

These teachings are suitable for use with a wide variety of rendering approaches and with a wide variety of materials discrimination methodologies. Satisfactory results can be attained using essentially any approach to assessing confidence as pertains to identifying a particular material. It will be appreciated that these teachings are readily scaled to include any number and combination of color components. When employed, the resultant rendered images provide a considerably enriched depth of information to the viewer. In many cases, the information regarding confidence is communicated in a way that is intuitively meaningful to the viewer even in the absence of substantial training.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one illustrative example in these regards, the aforementioned confidence information may only be displayed (initially and/or subsequently) when specifically sought by the end user. For example, the confidence information content might only be displayed for a given material when the end user places a cursor over the corresponding image portion.

As another illustrative example in these regards, these teachings can be employed in an application setting that utilizes filtering. More specifically, in many application settings the end user will often filter the image data in some fashion. This may involve operations such as smoothing or filtering Z, smoothing, sharpening or filtering P, edge-enhancing or edge-detecting P, segmenting or clustering P and/or Z, windowing P and/or Z, and/or performing equalization or adaptive histogram equalization on P (to note but a few examples in these regards). In this case, one can generally use the processed P (which may have lost its absolute meaning) and Z to determine the potential colorings for different levels of confidence, but use the original P (or P with only smoothing operations) to choose among those potential colorings.

Note also that when filtering Z (or the data used to calculate Z), these teachings will accommodate having the filtering affect the confidence values. This can be done, for example, by noise propagation (where here $\sigma_z$ is interpreted as a Z accuracy or standard deviation):

when the smoothing kernel blends together similar Z values, decrease $\sigma_z$ (increase confidence);

when the smoothing kernel blends together diverse Z values, increase $\sigma_z$ (decrease confidence);

when the smoothing kernel blends together values with poor confidence, the output has poor confidence.

The following noise propagation model can accomplish both of these:

$$\sigma^2_{Zout}(i,j) = \sum_{n=-w}^{w}\sum_{m=-h}^{h} w^2_{n,m}[f_{propagated} \times \sigma^2_{Zin}(i+m, j+n) + f_{empirical} \times Z^2_{diff}(i+m, j+n)]$$

where:

$\sigma_{Zin}$ is the uncertainty of each value before filtering, $\sigma_{Zout}$ is the uncertainty of each value before filtering, and $Z_{diff}$ is the difference between the input and output values of the filter $w_{n,m}$ are the filtering kernel coefficients, or weights related to the filtering kernel and values of $f_{propagated}=1$ and $f_{empirical}=1$ or $f_{empirical}=0.5$ are reasonable choices. Furthermore, though these teachings are intended primarily for materials-discrimination algorithms that directly produce confidence-assessment values, with these teachings, even for materials-discrimination algorithms that do not directly produce confidence-assessment values, one can automatically generate confidence values by applying this noise-propagation model with $f_{propagated}=0$ and $f_{empirical}=1$. Accordingly, by one approach, the confidence information could be developed, at least in part, by empirically estimating the degree of confidence by measuring consistency of the information regarding material content of the target.

Another approach to having the filtering affect confidence values is to use morphological operators to dilate and/or erode a confidence mask according to the expected effect of a filtering kernel.

Additionally, the filtering itself may be confidence-aware. For example, the filtering kernel may dynamically adjust to give less weight to less-confident pixels, or to ignore pixels below a certain confidence criterion.

I claim:

1. A method comprising:
   at a control circuit:
      accessing image information regarding an image of a target, wherein the information comprises, at least in part, information regarding material content of the target;
      accessing confidence information regarding at least one degree of confidence as pertains to the material content of the target;
      using the confidence information to facilitate rendering the image such that the rendered image conveys information both about materials included in the target and a relative degree of confidence that the materials are correctly identified.

2. The method of claim 1 wherein using the confidence information to facilitate rendering the image such that the rendered image conveys information both about materials included in the target and a relative degree of confidence that the materials are correctly identified comprises, at least in part, selecting a color component as a function of the relative degree of confidence.

3. The method of claim 2 wherein selecting the color component comprises selecting values for at least one of:
   hue;
   chroma;
   saturation;
   lightness;
   brightness;
   transparency;
as is used to render a particular part of the target that is comprised of a particular material as a function of the relative degree of confidence that the particular material is correctly identified.

4. The method of claim 2 further comprising using another color component as a function of corresponding transmission information when rendering the image.

5. The method of claim 2 wherein selecting the color component comprises, at least in part, using a grayscale component to indicate a relative lack of confidence that the particular material is correctly identified.

6. The method of claim 2 wherein selecting the color component comprises using a confidence-level decision to assess when to select the color component as a function of the relative degree of confidence.

7. The method of claim 2 wherein selecting the color component comprises using a range of color selections to reflect a corresponding range of at least three differing degrees of confidence.

8. The method of claim 7 wherein using a range of color selections to reflect a corresponding range of at least three differing degrees of confidence comprises using a plurality of different color tuples to indicate corresponding differing degrees of confidence.

9. The method of claim 2 wherein selecting the color component comprises rendering the particular part of the target using, discretely, both a first color component that indicates a high degree of confidence and a second color component that indicates a relatively lower degree of confidence, wherein the second color component is present in an amount that is related to the relatively lower degree of confidence.

10. The method of claim 2 wherein selecting the color component comprises rendering a particular part of the target using, discretely, both a first color component that indicates one estimate of the material content and a second color component that indicates a second estimate of the material content, wherein the first and second color components are present in amounts that are related to the degrees of confidence for the one estimate and the second estimate.

11. The method of claim 1 wherein using the confidence information to facilitate rendering the image such that the rendered image conveys information both about materials included in the target and a relative degree of confidence that the materials are correctly identified comprises, at least in part, varying an animation component as a function of at least the relative degree of confidence.

12. The method of claim 1 wherein accessing confidence information regarding at least one degree of confidence as pertains to the material content of the target comprises accessing information regarding at least one of:
an insufficient quantity of material;
an excessive quantity of material;
noise;
motion;
structure;
registration;
aliasing risk;
a disallowed region;
a priori information.

13. The method of claim 1 wherein accessing confidence information regarding at least one degree of confidence as pertains to the material content of the target comprises accessing a confidence-related score that is updated during each stage of processing that affects the information regarding material content of the target.

14. The method of claim 1 wherein accessing confidence information regarding at least one degree of confidence as pertains to the material content of the target comprises, at least in part, empirically estimating the degree of confidence by measuring consistency of the information regarding material content of the target.

15. An apparatus comprising:
a memory having stored therein:
image information regarding an image of a target, wherein the information comprises, at least in part, information regarding material content of the target;
confidence information regarding at least one degree of confidence as pertains to the material content of the target;
a control circuit operably coupled to the memory and configured to use the confidence information to facilitate rendering the image such that the rendered image conveys information both about materials included in the target and a relative degree of confidence that the materials are correctly identified.

16. The apparatus of claim 15 wherein the control circuit is configured to use the confidence information to facilitate rendering the image such that the rendered image conveys information both about materials included in the target and a relative degree of confidence that the materials are correctly identified by, at least in part, selecting a color component as a function of the relative degree of confidence.

17. The apparatus of claim 16 wherein selecting the color component comprises altering at least one of:
hue;
chroma;
saturation;
lightness;
brightness;
transparency;
as is used to render a particular part of the target that is comprised of a particular material as a function of the relative degree of confidence that the particular material is correctly identified.

18. The apparatus of claim 14 wherein the control circuit is configured to select the color component by, at least in part, using a grayscale component to indicate a relative lack of confidence that the particular material is correctly identified.

19. The apparatus of claim 14 wherein the control circuit is configured to select the color component by using a confidence-level threshold to assess what color component to select as a function of the relative degree of confidence.

20. The apparatus of claim 14 wherein the control circuit is configured to select the color component by using a range of color selections to reflect a corresponding range of at least three differing degrees of confidence.

21. The apparatus of claim 20 wherein the control circuit is configured to use a range of color selections to reflect a corresponding range of at least three differing degrees of confidence by using a plurality of different color tuples to indicate corresponding differing degrees of confidence.

22. The apparatus of claim 16 wherein the control circuit is configured to select the color component by rendering the particular part of the target using, discretely, both a first color component that indicates a high degree of confidence and a second color component that indicates a relatively lower degree of confidence, wherein the second color component is present in an amount that is related to the relatively lower degree of confidence.

23. The apparatus of claim 15 wherein the control circuit is configured to use the confidence information to facilitate rendering the image such that the rendered image conveys information both about materials included in the target and a relative degree of confidence that the materials are correctly identified by, at least in part, varying an animation component as a function of the relative degree of confidence.

24. The apparatus of claim 15 wherein the confidence information regarding at least one degree of confidence as pertains to the material content of the target comprises information regarding at least one of:
an insufficient quantity of material;
an excessive quantity of material;
noise;
motion;
structure;
registration;
aliasing risk;
a disallowed region;
a priori information.

* * * * *